(12) United States Patent
Ho

(10) Patent No.: US 8,087,161 B2
(45) Date of Patent: Jan. 3, 2012

(54) ASSEMBLING DEVICE WITH POSITIONING BLOCK

(75) Inventor: Kun-Hung Ho, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 504 days.

(21) Appl. No.: 12/400,880

(22) Filed: Mar. 10, 2009

(65) Prior Publication Data

US 2010/0122452 A1 May 20, 2010

(30) Foreign Application Priority Data

Nov. 14, 2008 (CN) .......................... 2008 1 0305553

(51) Int. Cl.
*H05K 13/04* (2006.01)
*B23P 19/00* (2006.01)

(52) U.S. Cl. ................. 29/759; 29/760; 29/729; 29/428

(58) Field of Classification Search .................... 29/729, 29/700, 739, 592.1, 740–743, 757, 760, 400, 29/428, 762, 764; 118/500, 504; 116/306
See application file for complete search history.

(56) References Cited

U.S. PATENT DOCUMENTS

| | | | | |
|---|---|---|---|---|
| 2,760,547 A * | 8/1956 | Dempnock, Jr. | ............... | 156/564 |
| 4,953,287 A * | 9/1990 | West et al. | ...................... | 29/611 |
| 5,572,144 A * | 11/1996 | Davidson et al. | ........ | 324/750.19 |
| 5,869,976 A * | 2/1999 | Kelley et al. | ............. | 324/750.25 |
| 6,094,785 A * | 8/2000 | Montgomery et al. | ......... | 24/324 |
| 6,507,994 B2 * | 1/2003 | Yoshida et al. | .................. | 29/729 |
| 7,013,558 B2 * | 3/2006 | Bachman | ......................... | 29/832 |
| 7,600,930 B2 * | 10/2009 | Wang et al. | .................... | 396/448 |
| 7,755,378 B2 * | 7/2010 | Chang et al. | ............. | 324/750.25 |
| 7,949,242 B2 * | 5/2011 | Yang et al. | ....................... | 396/29 |
| 7,992,286 B2 * | 8/2011 | Liang | .............................. | 29/729 |
| 8,002,481 B2 * | 8/2011 | Cheng | .......................... | 396/448 |
| 2004/0226167 A1 * | 11/2004 | Tseng et al. | .................... | 29/729 |
| 2006/0248711 A1 * | 11/2006 | Lu et al. | ........................... | 29/760 |
| 2008/0044173 A1 * | 2/2008 | Wang et al. | ..................... | 396/448 |
| 2009/0255455 A1 * | 10/2009 | Shi et al. | ......................... | 116/306 |
| 2010/0095518 A1 * | 4/2010 | Lee et al. | ......................... | 29/729 |

* cited by examiner

*Primary Examiner* — Derris H Banks
*Assistant Examiner* — Kaying Kue
(74) *Attorney, Agent, or Firm* — Altis Law Group, Inc.

(57) ABSTRACT

An assembling device for assembling an electronic device which includes a front shell, a rear shell, a lens cover mounted on one of the front and rear shells includes a supporting member and a pressing member. The supporting member includes a base and a positioning block according to the lens cover to be assembled. The base defines a well for receiving the electronic device to be assembled. The positioning block is positioned in the well and has an adjustable height relative to the bottom surface of the well. The pressing member includes a pressing portion which is configured for pressing one of the front and rear shells of the electronic device. Thereby when assembling the electronic device, the height of the positioning block can be adjusted to press or not press the lens cover depending on which of the front and rear shells is assembled.

10 Claims, 6 Drawing Sheets

ASSEMBLING DEVICE WITH POSITIONING BLOCK

BACKGROUND

1. Technical Field

The present disclosure relates to assembling devices and, particularly, to an assembling device with a positioning block.

2. Description of the Related Art

Portable electronic devices, such as mobile telephones, have become increasingly popular for general use. These portable electronic devices are also becoming multifunctional, such as the mobile telephone having a camera module for capturing images. As the number of functions increase, more accessories are assembled with the portable electronic devices and assembling the accessories while keeping the portable electronic devices compact becomes a challenge. Generally, the accessories are assembled onto the portable devices respectively. However, it is unduly time-consuming.

Therefore, it is desirable to provide an assembling device with a positioning block which can overcome the above-mentioned problem.

DETAILED DESCRIPTION OF THE EMBODIMENTS

Figure 1:
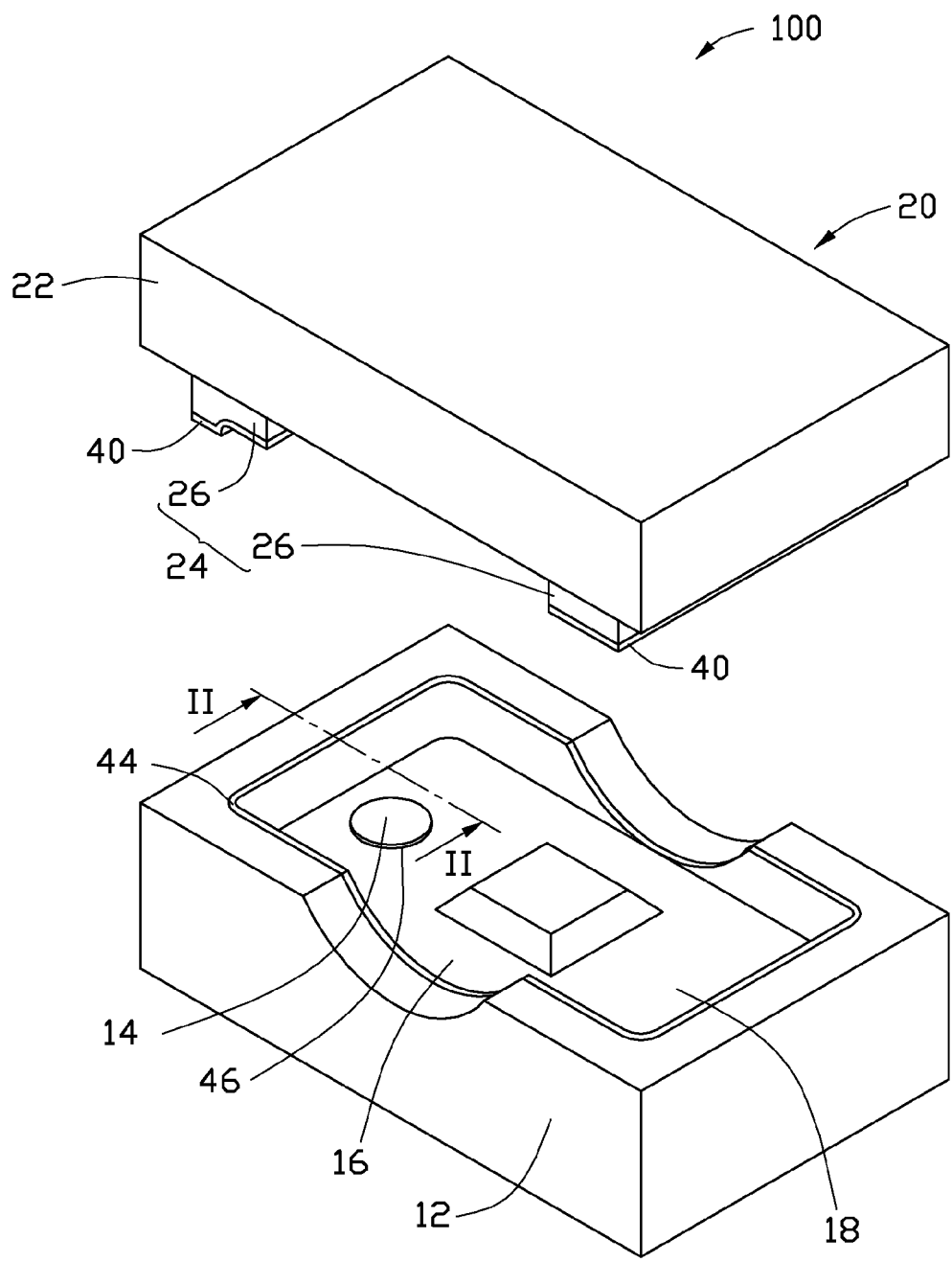
FIG. 1 is a schematic isometric view of an assembling device having a positioning block and a supporting member according to an exemplary embodiment.
Figure 2:
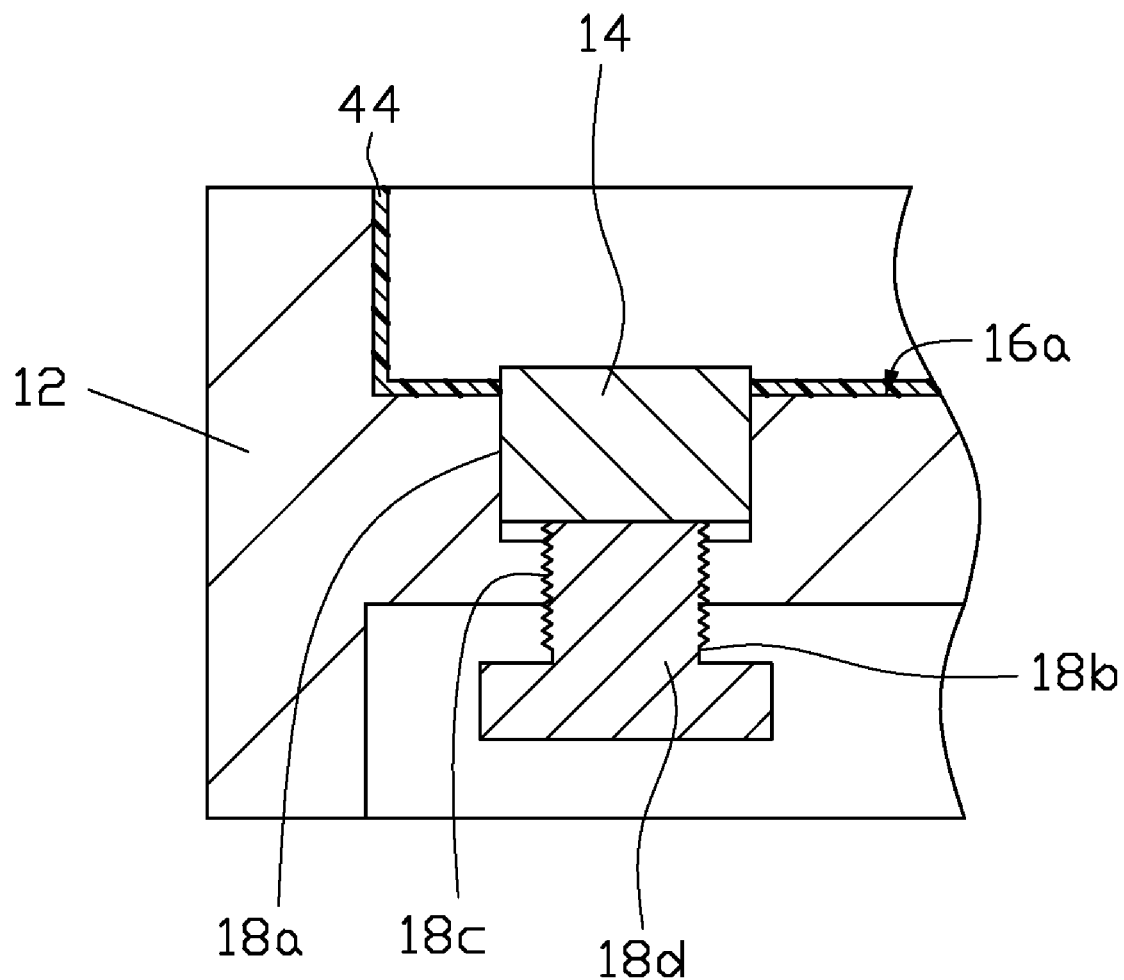
FIG. 2 is a cross-sectional view of the positioning block of the assembling device of FIG. 1 taken along line II-II.

Referring to FIG. 1, an assembling device 100 according to an exemplary embodiment includes a supporting member 10 and a pressing member 20. The supporting member 10 is matched with the pressing member 20 to define a receiving space 18 for receiving a portable electronic device 30 to be assembled (see FIG. 3).

The supporting member 10 includes a base 12 and a positioning block 14. The base 12 defines a well 16 thereon. The bottom surface 16a of the well 16 defines a receiving hole 18a and a guiding hole 18b. The receiving hole 18a communicates with the guiding hole 18b and go completely through a portion of the base 12. In the embodiment, the internal diameter of the guiding hole 18b is smaller than the diameter of the receiving hole 18a. The positioning block 14 is received in the receiving hole 18a. A screw thread 18c is disposed on the sidewall of the guiding hole 18b. A bolt 18d is matched with the screw thread 18c for moving along the sidewall of the guiding hole 18b to adjust the height of the positioning block 14 according to preference. The length of the bolt 18d is larger than the total depth of the receiving hole 18a and the guiding hole 18b along the direction substantially perpendicular to the bottom surface 16a, such that, the bolt 18d can move along the direction substantially perpendicular to the bottom surface 16a to adjust the height of the positioning block 14 relative to the bottom surface 16a of the well 16.

The pressing member 20 includes a main body 22 and a pressing portion 24. The pressing portion 24 extends from the main body 22 along a direction substantially perpendicular to the main body 22. When the assembling device 100 is not in use, the pressing portion 24 of the pressing member 20 can be received in the well 16 for conveniently to place. In the embodiment, the pressing portion 24 includes two spaced-apart pressing blocks 26. The gap of the two pressing blocks 26 corresponds to the surface of the portable electronic device 30 to be pressed. It is to be understood, the two pressing blocks 26 can be moveably disposed on the main body 22 for adjusting the gap therebetween for adapting different portable electronic devices.

To protect the portable electronic device 30 from being damaged when the pressing member 20 is matched with the base 10 presses the portable electronic device 30, pads are disposed on the two pressing blocks 26, the bottom surface 16a, and the sidewalls of the well 16. In the embodiment, two first pads 40 are disposed on the pressing blocks 26 of the pressing member 20, and a second pad 44 is disposed on the bottom surface 16a and the sidewalls of the well 16. The second pad 44 defines a through hole 46 corresponding to the positioning block 14 to allow the positioning block 14 to extend though the second pad 44.

Referring to FIGS. 3-6, the assembling device 100 is used to assemble a portable electronic device. In the exemplary embodiment, the assembling device 100 is used to assemble the mobile telephone 30. The mobile telephone 30 includes a front shell 32, an opposite rear shell 34, a camera module 36 and a lens cover 38 disposed on the rear shell 34 and configured for protecting the camera module 36 from being damaged. The lens cover 38 need to be pressed after the lens cover 38 is glued to the rear shell 34.

Figure 3:
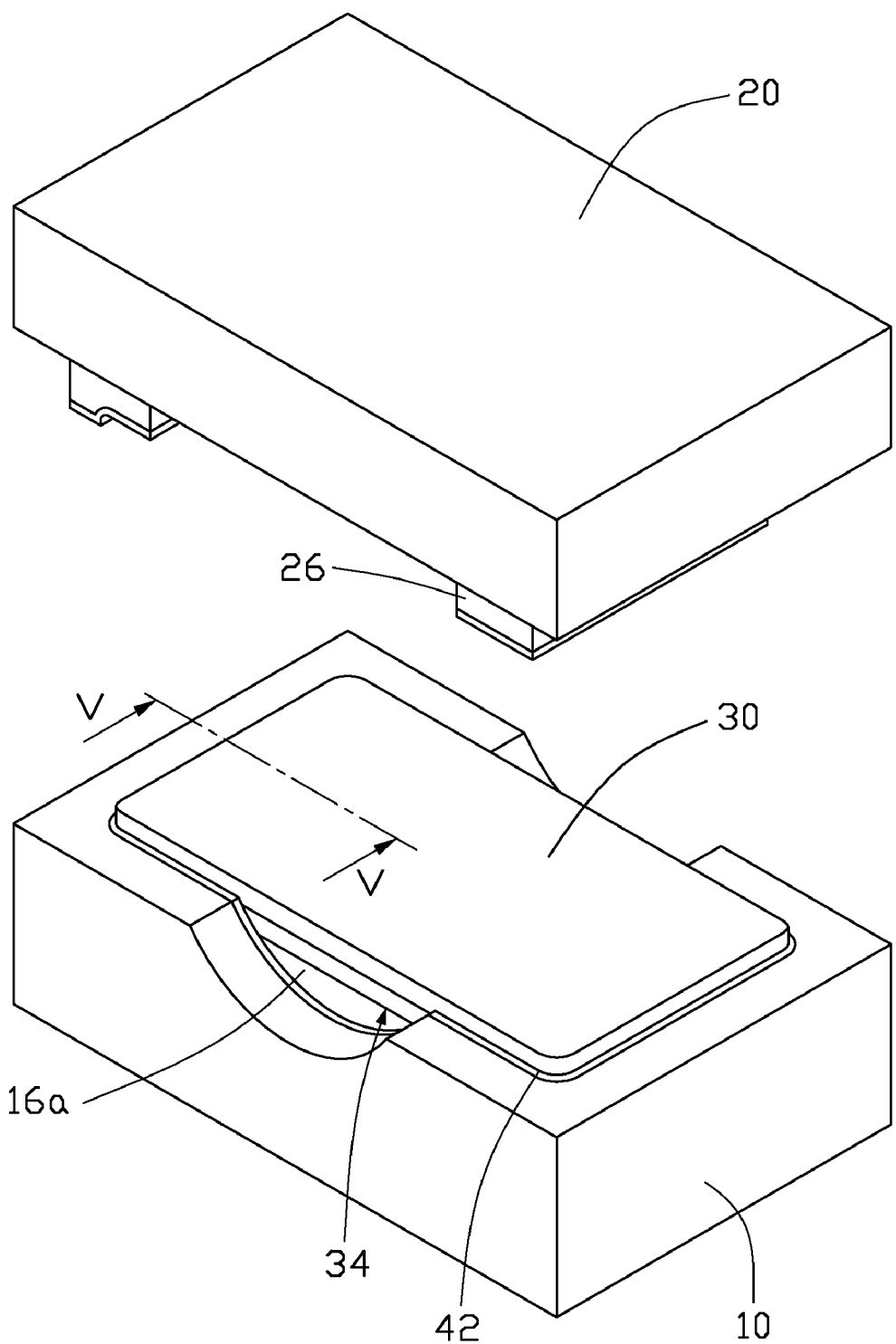
FIG. 3 is a schematic isometric view of a portable electrical device having a lens cover placed on the supporting member of the assembling device, shown in FIG. 1.
Figure 4:
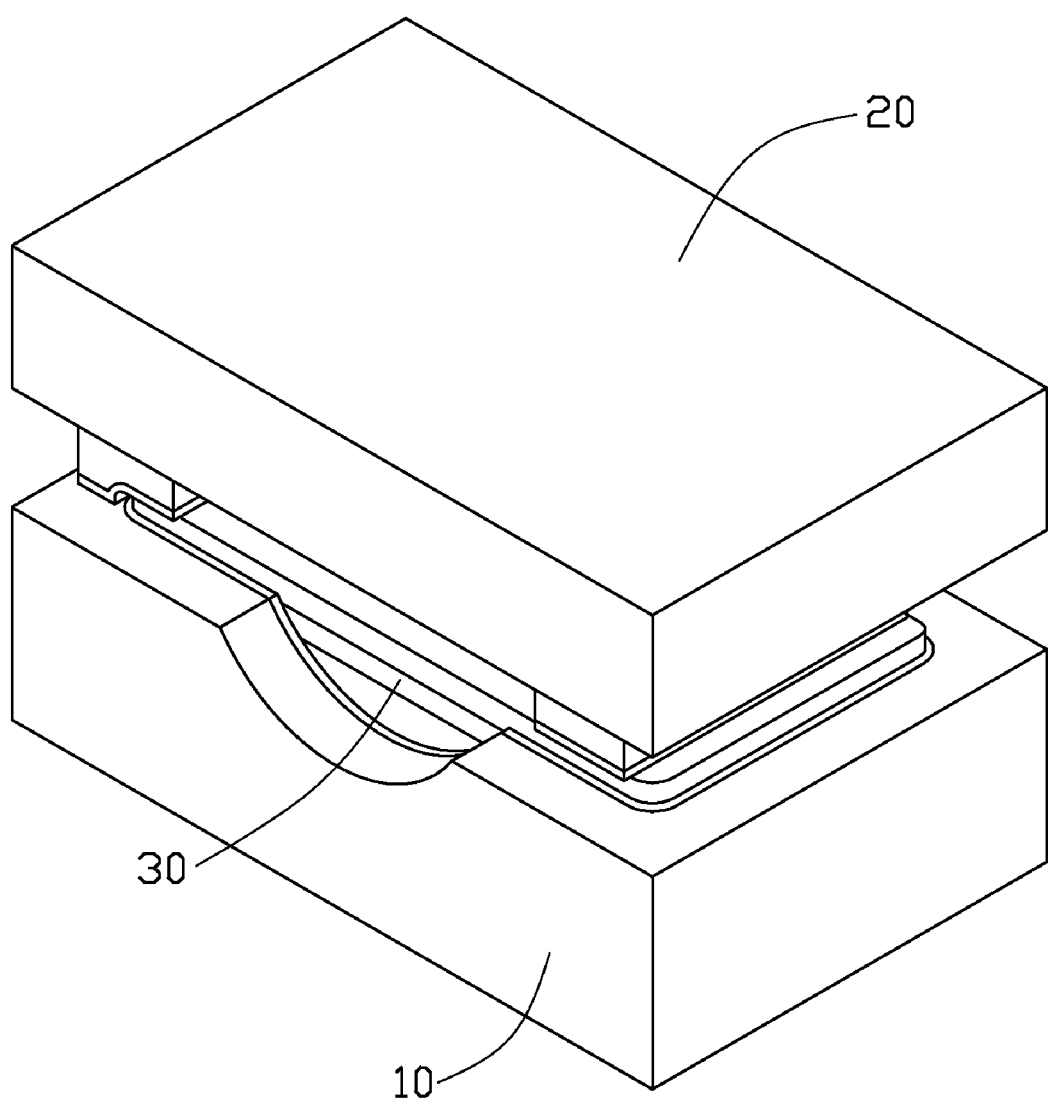
FIG. 4 is a schematic isometric view of an assembling state of the assembling device of FIG. 1 assembling the portable electrical device.
Figure 5:
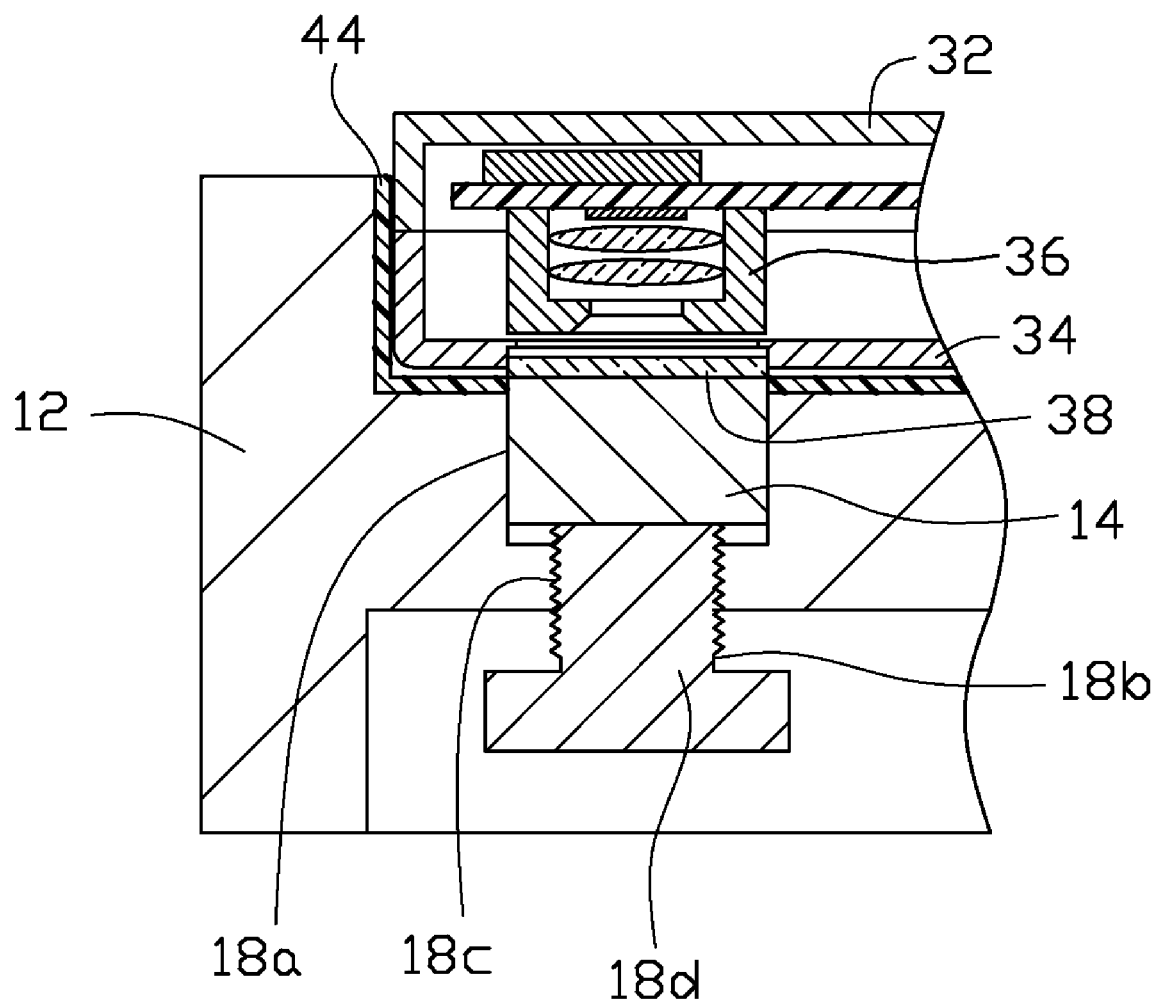
FIG. 5 is a cross-sectional view of the lens cover before being pressed by the assembling device of FIG. 1 taken along line V-V.

In assembling, the front shell 32 and the lens cover 38 of the mobile telephone 30 are assembled first. The mobile telephone 30 is placed in the well 16 of the base 12 as shown in FIG. 3. The pressing member 20 is aligned with the mobile telephone 30 and can be driven by a mechanism (not shown) to move toward the base 12 along a direction which is perpendicular to the base 12 and press the mobile telephone 30 as shown in FIG. 4. The mechanism may be a pressure device or a hydraulic pressure device. Because the lens cover 38 is disposed on the rear shell 34, the height of the positioning block 14 relative to the bottom of the well 16 should be adjusted by the bolt 18d to match height of the positioning block 14 with the position of the lens cover 38 of the mobile telephone 30. The pressing member 20 is driven to press the front shell 32 of the mobile telephone 30, and the positioning block 14 simultaneously presses the lens cover 38 of the mobile telephone 30.

Figure 6:
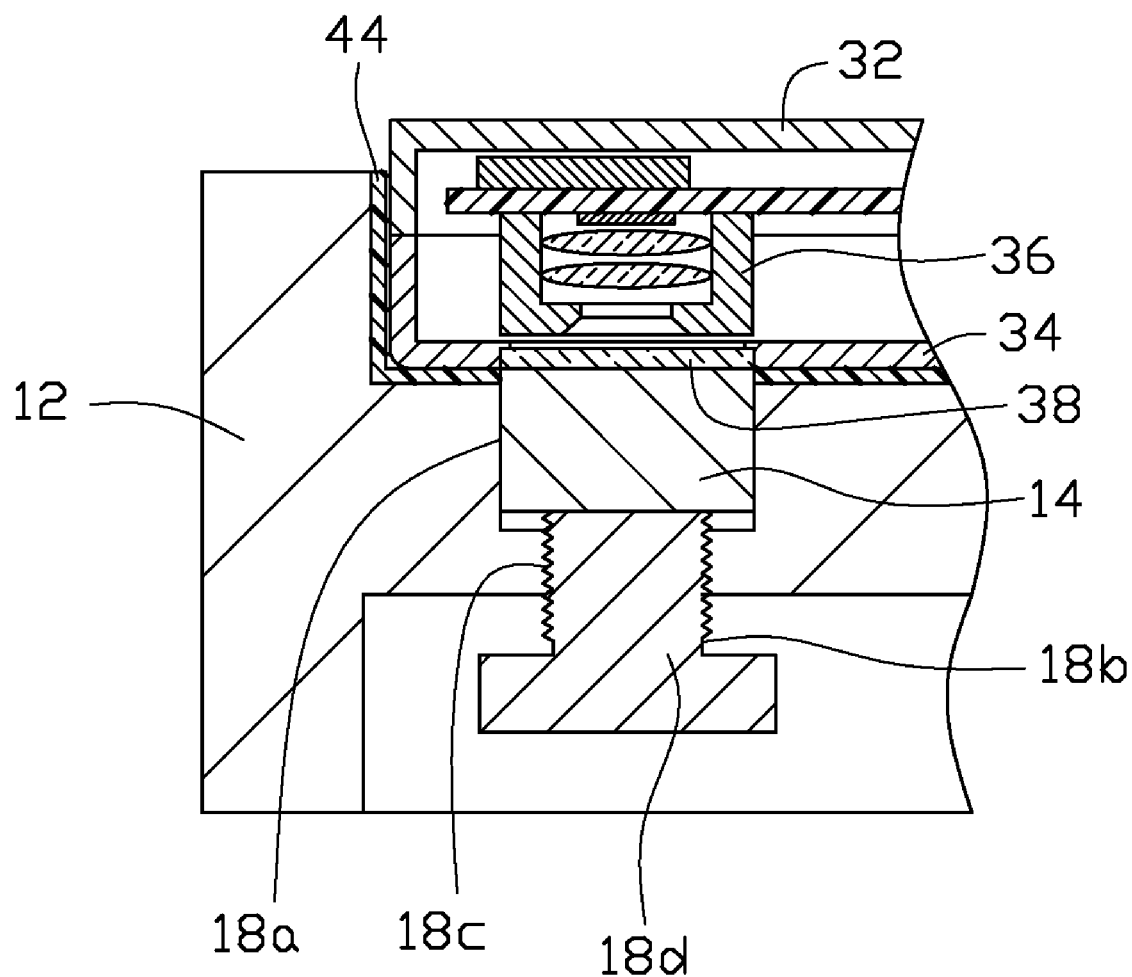
FIG. 6 is similar to FIG. 5, but showing the lens cover being assembled by the assembling device of FIG. 1.

After the front shell 32 and the lens cover 38 are pressed on to the mobile telephone 30, the lens cover 38 is coplanar with the rear shell 34 as shown in FIG. 6. The mobile telephone 30 can be overturned to align the pressing member 20 with the rear shell 34 of the mobile telephone 30. Because the lens cover 38 of the mobile telephone 30 has been pressed by the pressing member 20, the positioning block 14 should be adjusted to be coplanar with the bottom surface 16a of the well 16 with the bolt 18d for protecting the front shell 32 of the mobile telephone 30 from being damaged.

The assembling device 100 can assemble the lens cover 38 and front shell 32 of portable electronic device 30 at the same time is time-efficient. The positioning block 14 can be adjusted to a preferred/predetermined height so that lens cover 38 having various height protruded on the rear shell 34 can be pressed, thereby the assembling device 100 is convenient.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. An assembling device for assembling an electronic device, the electronic device comprising a front shell, a rear shell, and a lens cover being mounted on one of the front and rear shells, the assembling device comprising:
a supporting member comprising a base and a positioning block, the base defining a well for receiving the electronic device to be assembled, the positioning block positioned in the well and having an adjustable height relative to the bottom surface of the well; and
a pressing member comprising a pressing portion configured for pressing one of the front and rear shells of the electronic device; whereby when assembling the electronic device, the height of the positioning block can be adjusted to press or not press the lens cover depending on which of the front and rear shells is being assembled.

2. The assembling device of claim 1, wherein the bottom surface of the well defines a receiving hole, the positioning block received in the receiving hole.

3. The assembling device of claim 2, wherein the bottom surface of the well further defines a guiding hole, the guiding hole is communicated with the receiving hole, the depth of the receiving hole and the guiding hole is the same as the length of the base along a direction substantially perpendicular to the bottom surface.

4. The assembling device of claim 3, wherein the internal diameter of the guiding hole is smaller than the diameter of the receiving hole.

5. The assembling device of claim 4, wherein the base comprises a screw thread and a bolt, the screw thread is disposed on the sidewall of the guiding hole, the bolt is matched with the screw thread.

6. The assembling device of claim 5, wherein the length of the bolt is larger than the total depth of the receiving hole and the guiding hole along a direction substantially perpendicular to the bottom surface of the well.

7. The assembling device of claim 1, wherein the pressing member further comprises a main body, the pressing portion extends from the main body along a direction substantially perpendicular to the main body.

8. The assembling device of claim 1, wherein the pressing portion comprises two spaced-apart pressing blocks.

9. The assembling device of claim 8, further comprising two first pads, wherein the first pads are respectively disposed on the pressing blocks.

10. The assembling device of claim 1, further comprising a second pad, the second pad is disposed on the sidewalls and the bottom surface of the well, the second pad defines a through corresponding to the positioning block.

* * * * *